US010293669B2

(12) United States Patent
Goldwitz

(10) Patent No.: US 10,293,669 B2
(45) Date of Patent: May 21, 2019

(54) SOFT TOP WINDOW SUPPORTS AND VEHICLES WITH SOFT TOP WINDOW SUPPORTS

(71) Applicant: Brian Goldwitz, New Haven, CT (US)

(72) Inventor: Brian Goldwitz, New Haven, CT (US)

( * ) Notice: Subject to any disclaimer, the term of this patent is extended or adjusted under 35 U.S.C. 154(b) by 0 days.

(21) Appl. No.: 15/826,589

(22) Filed: Nov. 29, 2017

(65) Prior Publication Data

US 2018/0147924 A1      May 31, 2018

Related U.S. Application Data

(60) Provisional application No. 62/428,506, filed on Nov. 30, 2016.

(51) Int. Cl.
*B60J 7/12*      (2006.01)
*B60J 7/10*      (2006.01)
*B60J 11/08*     (2006.01)

(52) U.S. Cl.
CPC .............. *B60J 7/1265* (2013.01); *B60J 7/104* (2013.01); *B60J 11/08* (2013.01)

(58) Field of Classification Search
CPC ................................ B60J 7/1265; B60J 11/08
USPC ..................................................... 296/107.07
See application file for complete search history.

(56) References Cited

U.S. PATENT DOCUMENTS 8,336,948 B2 * 12/2012 Brown .................... B60J 1/1815
                                                    296/107.07

* cited by examiner

*Primary Examiner* — Pinel E Romain
(74) *Attorney, Agent, or Firm* — Loza & Loza, LLP; Julio M. Loza; Tyler J. Barrett

(57) ABSTRACT

Supports for rear windows and rear window panels of a soft top structure may include a first support arm pivotably coupled to a portion of a vehicle. A second support arm may be pivotably coupled to the first support arm, and may further be pivotably coupled to a rear window panel of the soft top structure. The first support arm and the second support arm can be connected to pivot relative to each other to form an angle less than 180° in an open position, and an angle substantially greater than 180° in a closed position. Other aspects, embodiments, and features are also included.

8 Claims, 5 Drawing Sheets

SOFT TOP WINDOW SUPPORTS AND VEHICLES WITH SOFT TOP WINDOW SUPPORTS

PRIORITY CLAIM

The present Application for patent claims priority to Provisional Application No. 62/428,506 entitled "Devices For Vehicles With Soft Tops Like a Jeep" filed Nov. 30, 2016, the entire disclosure of which is incorporated by reference herein.

TECHNICAL FIELD

The technology discussed below relates generally to automotive features, and more specifically to devices for retaining a soft top window in an opened position.

BACKGROUND

JEEP is a brand of American automobiles that makes sport utility vehicles and off-road vehicles. Some models of vehicles produced under the JEEP brand include options to use a soft top to cover the interior of the vehicle. Such soft tops can include a back window that is flexible and configured to be rotated upward at a hinged connection to access the back storage area of the vehicle. Typically, however, the user must hold the back window up while simultaneously attempting to access the back storage area. According to one aspect of the present disclosure, a support mechanism is provided to maintain a back window of a soft-top vehicle in an open position.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate holding a rear window panel of a soft top open. According to at least one embodiment, a support for a rear window panel of a vehicle soft top structure may include a first support arm pivotably coupled to a portion of a vehicle. A second support arm may be pivotably coupled to the first support arm, and may further be pivotably coupled to a rear window panel of the soft top structure. The first support arm and the second support arm are connected to pivot relative to each other to form an angle less than 180° in an open position, and an angle substantially greater than 180° in a closed position.

Further aspects of the present disclosure include vehicles including a support for a rear window panel of a soft top. According to one or more embodiments, a vehicle according to the present disclosure may include a soft top structure coupled to the vehicle, the soft top structure including a rear window panel. A first support arm may be pivotably coupled to a portion of the vehicle. A second support arm may be pivotably coupled to the first support arm, and pivotably coupled to the rear window panel. The first support arm and the second support arm are connected to pivot relative to each other to form an angle less than 180° in an open position, and an angle substantially greater than 180° in a closed position.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular support mechanism or vehicle, but are merely idealized representations which are employed to describe one or more aspects of the present disclosure. Additionally, elements common between figures may retain the same numerical designation.

Figure 1:
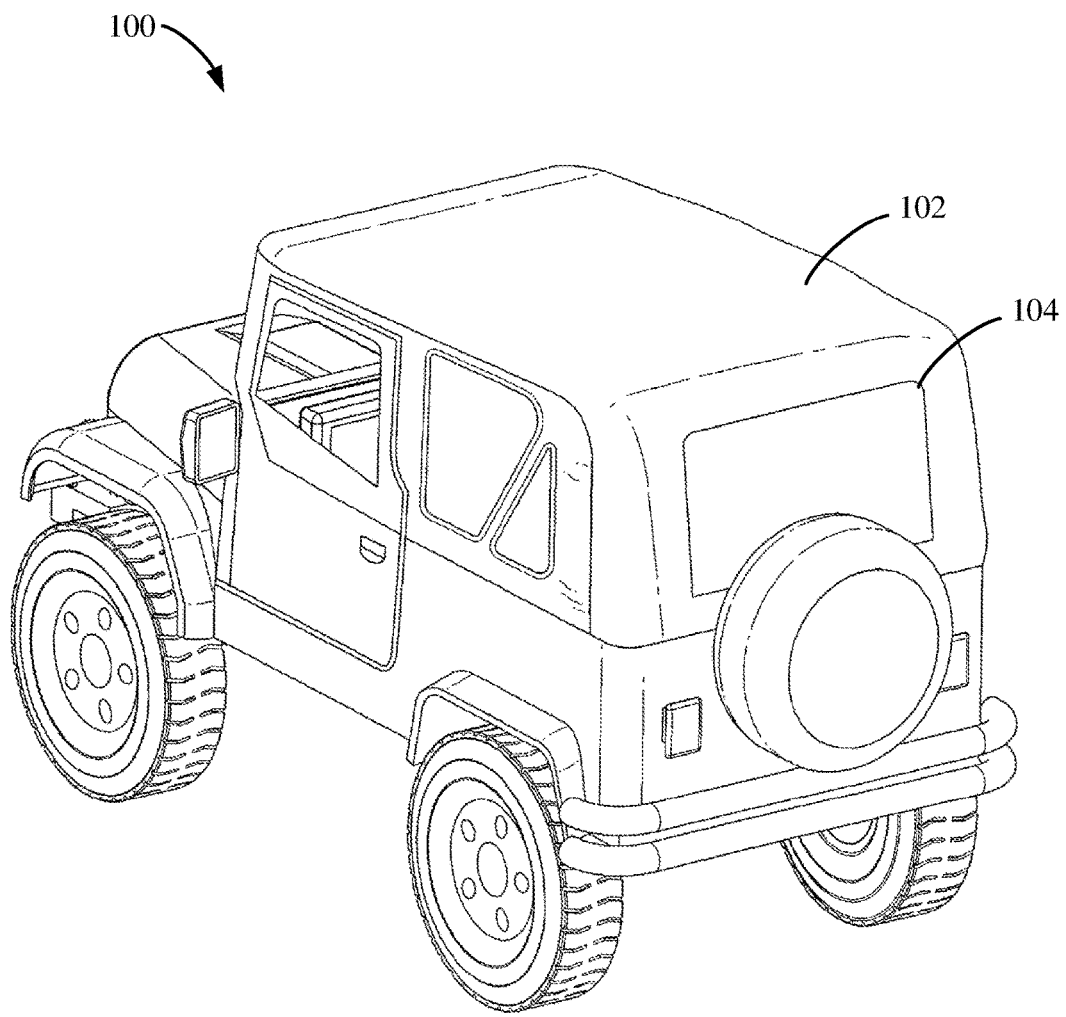
FIG. 1 is an isometric view of a vehicle where one or more aspects of the present disclosure may find application.

FIG. 1 is an isometric view of a vehicle 100 where one or more aspects of the present disclosure may find application. The vehicle 100 includes a top structure that is commonly referred to as a soft top 102, since it is typically made of a relatively flexible material compared to metal that is typically used for other vehicles. The soft top 102 includes a rear window 104 that is also relatively flexible. Typically, such a flexible rear window 104, and window panel which may include the rear window 104 and surrounding portions of the soft top 102, cannot be raised without a user holding it up to access the rear area of the vehicle 100. Accordingly, one or more aspects of the present disclosure include supports configured to maintain the rear window 104 of the soft top 102 in an open position.

Figure 2:
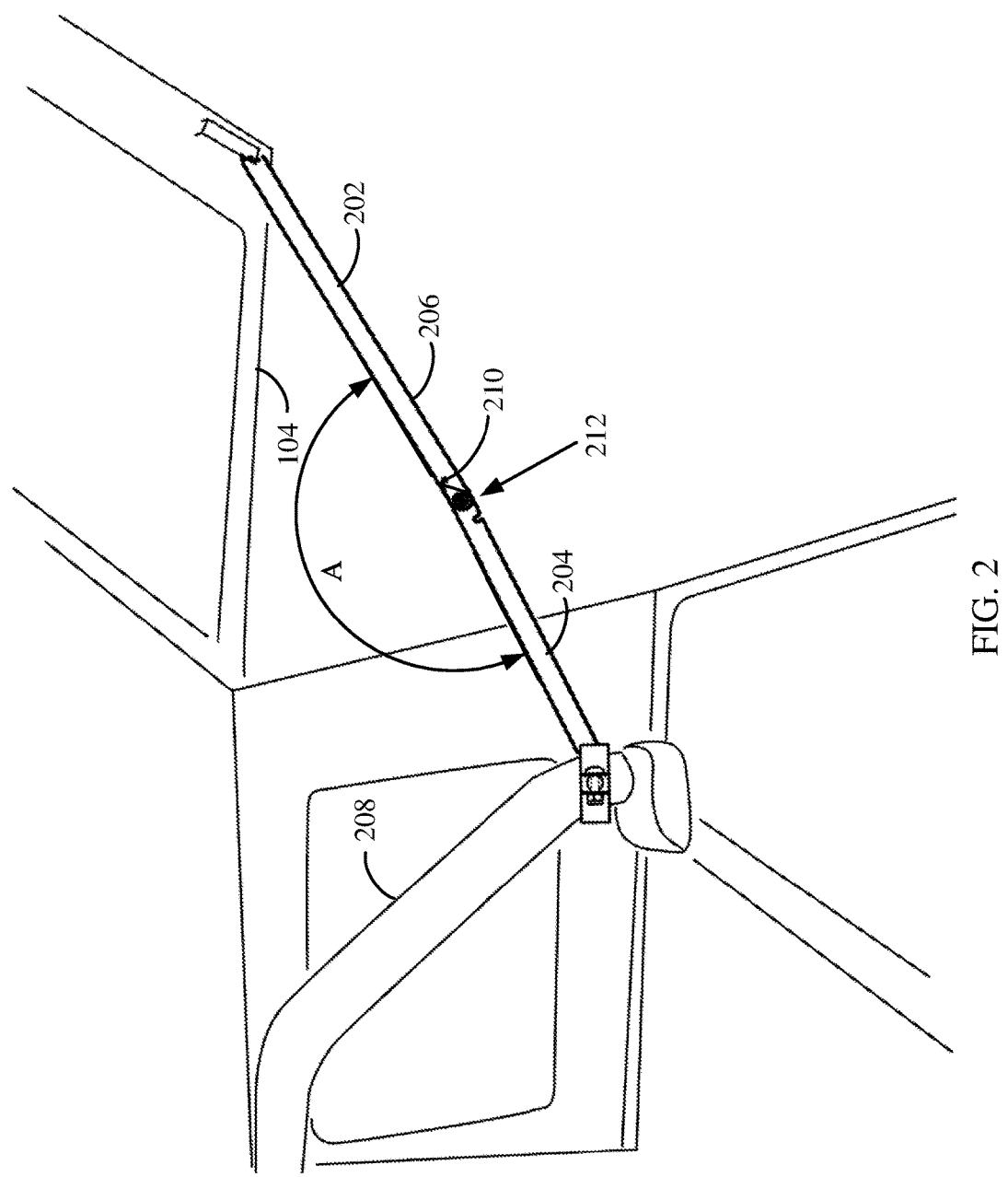
FIG. 2 is a partial side view of a vehicle with the rear window maintained in the open position by a support.

FIG. 2 is a partial side view of the vehicle 100 with the rear window 104 maintained in the open position by a support 202. As shown, the support 202 generally includes a first support arm 204 and a second support arm 206. The first support arm 204 is pivotably coupled to a portion of the vehicle frame, such as a roll bar 208 or other structure. In at least one embodiment, a ring may be disposed around the roll bar 208, and the first support arm 204 can be pivotably coupled to the ring. In other embodiments, the first support arm 204 may simply be bolted to a portion of the vehicle 100 in a many to facilitate pivoting of the first support arm 204 relative to the vehicle 100.

Figure 5:
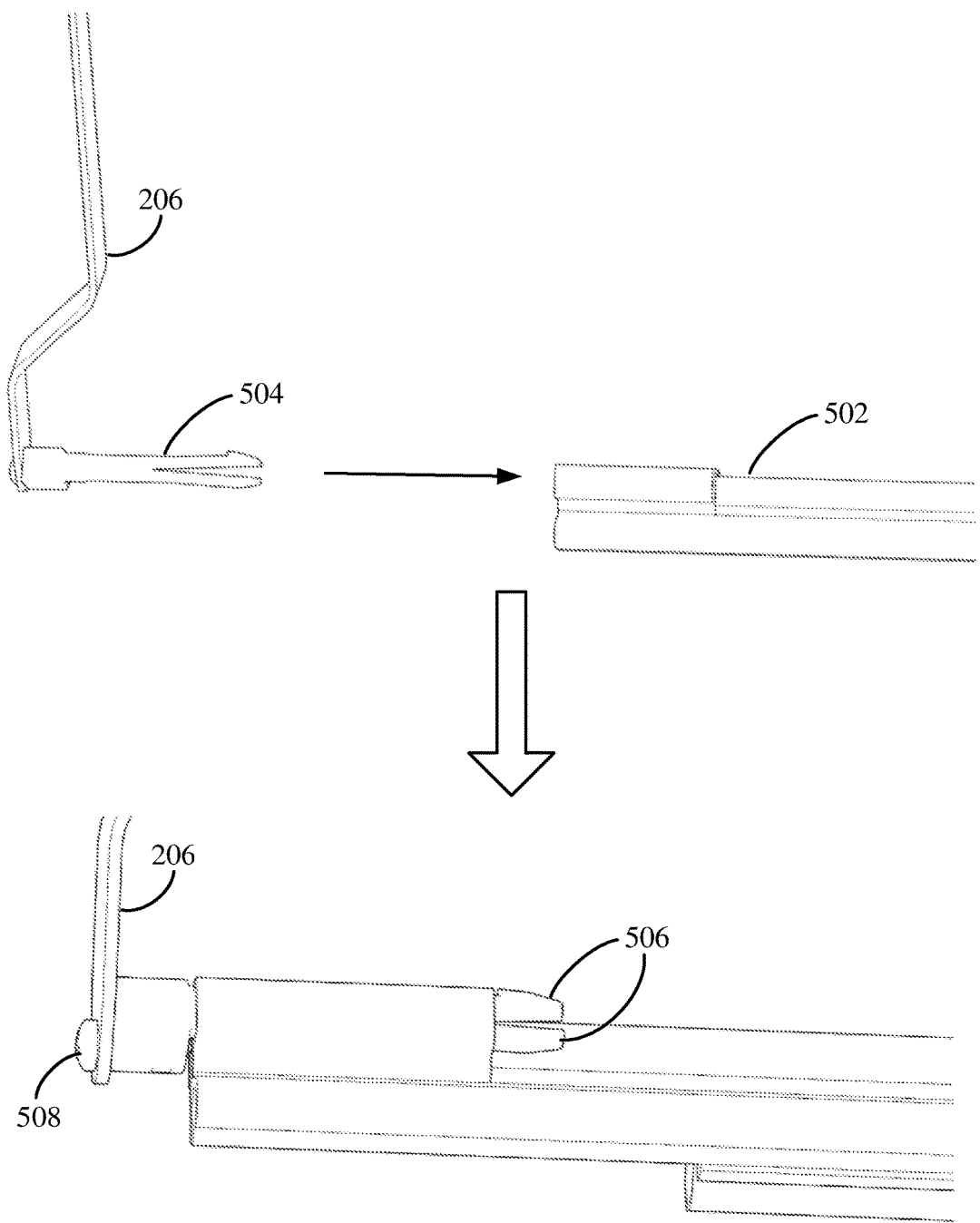
FIG. 5 shows a connector utilized in coupling the support to the window.

The first support arm 204 is also pivotably coupled to the second support arm 206. The second support arm 206 is pivotably coupled to the first support arm 204, as noted, and also pivotably coupled to the rear window 104. In at least one embodiment, the second support arm 206 can be pivotably coupled a bottom edge of the movable section of the soft top 102 including the rear window 104. For instance, FIG. 5 illustrates one example for coupling the second support arm 206 to the rear window 104. As shown in FIG. 5, the rear window 104 typically includes a box-shaped component 502 located at a bottom edge of the window 104

Figure 3:
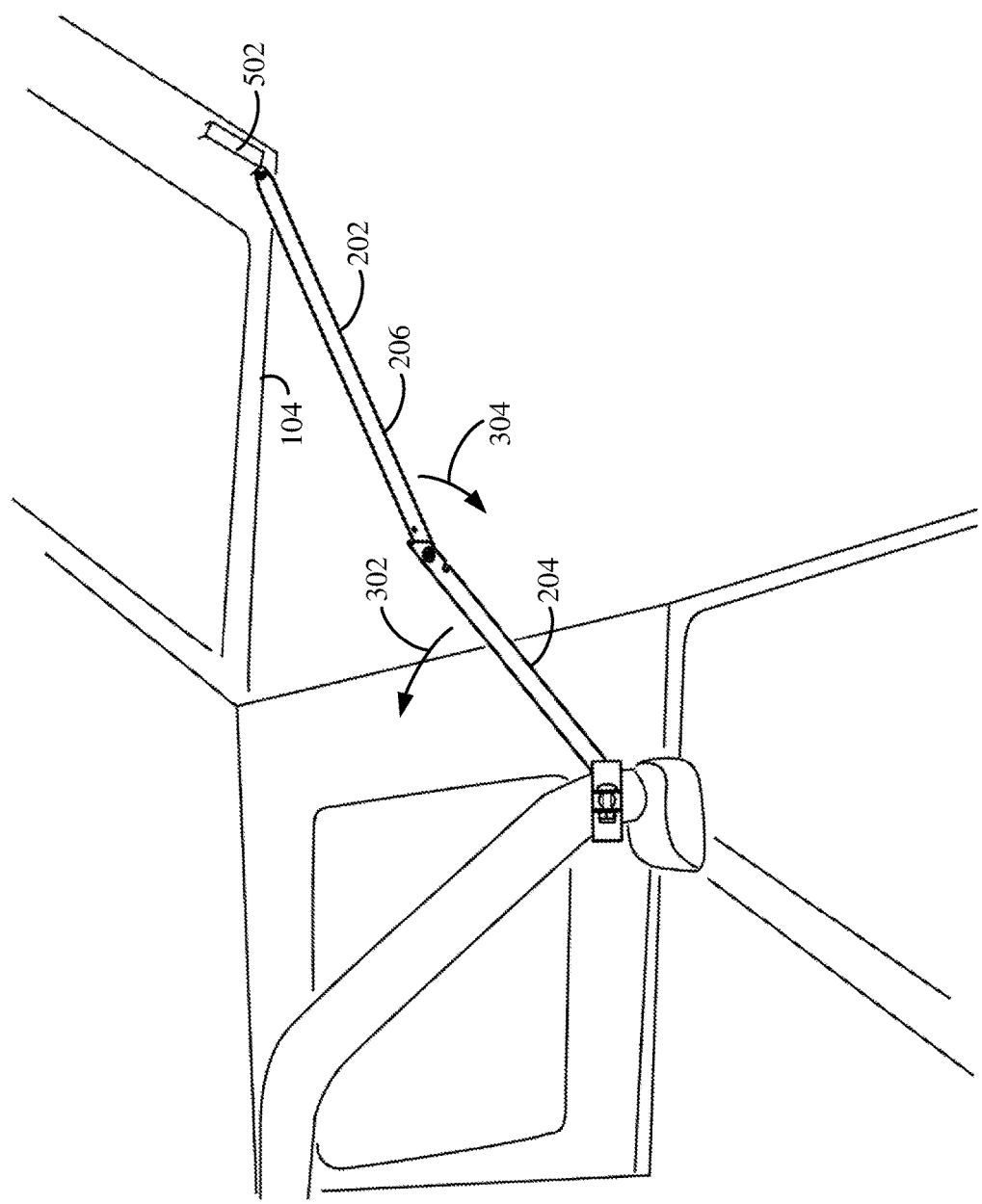
FIG. 3 is a partial side view of the vehicle showing the support transitioning from the open position to the closed position.

(see also FIG. 3). A connector 504 is configured to slide in the direction of the arrow in the top image into an aperture in the box-shaped component 502, and lock into position with clamp extensions 506, as shown in the lower image. The clamp extensions 506 includes two extensions separated by a space so they can be pushed together to fit into the aperture in the box-shaped component 502, and spaced from each other to retain the connector 504 in position. At an end opposite from the clamp extensions 506, the connector 504 includes a bolt, pin, or other similar component. The bolt 508 can be coupled to the second support arm 206.

The second support arm 206 may include a protrusion 210 to stop the first support arm 204 from over rotating relative to the second support arm 206. In other embodiments, a different mechanism may be employed as a stop to facilitate rotation of the first support arm 204 relative to the second support arm 206 up to a limit, and then to inhibit rotation beyond that stop mechanism.

According to an aspect of the disclosure, the first support arm 204 and the second support arm 206 are configured to pivot in the open position past center, so the first support arm 204 and the second support arm 206 are not parallel. Instead, the first support arm 204 and the second support arm 206 are slightly angled to each other in the locked position, such that the two arms 204, 206 form an angle less than 180° between their respective top surfaces, and an angle greater than 180° between their respective bottom surfaces. For example, with reference to FIG. 2, the angle A is less than 180° when the first support arm 204 and the second support arm 206 are positioned in the opened and locked position. In this manner, the weight of the rear window 104 will not be able to close the rear window by pushing down against the support 202.

When a user wishes to close the back window 104, the use can push upward to cause the first support arm 204 and the second support arm 206 to pivot relative to each other. For example, a user can push in the general direction of arrow 212. As shown in FIG. 3, the first support arm 204 begins to rotate upward (counterclockwise) in the direction of arrow 302, while the second support arm 206 begins to rotate downward (clockwise). As the respective support arms rotate, the rear window 104 can close downward.

Figure 4:
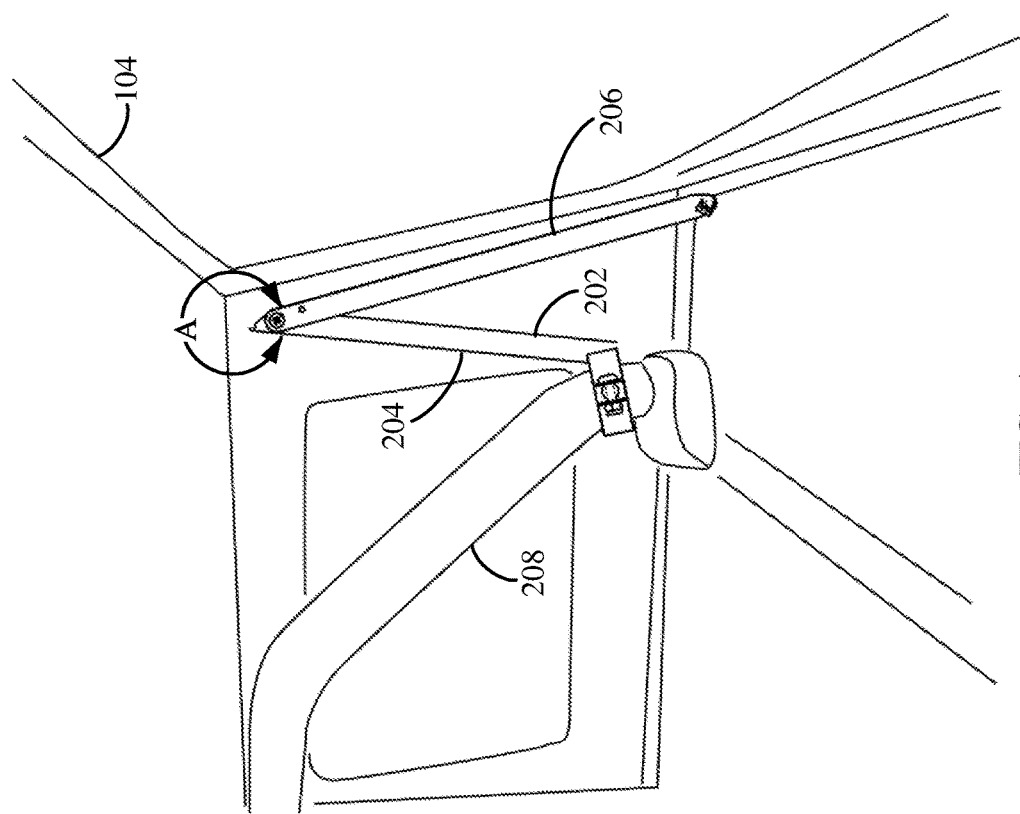
FIG. 4 is a partial side view of the vehicle with the rear window and the support in the closed position.

FIG. 4 illustrates the first support arm 204 and the second support arm 206 in the closed position. With the rear window 104 fully closed, the first support arm 204 and the second support arm 206 are near the roll bar 208 and out of the way from users in the vehicle. When the rear window 104 is in the closed position, a bar is typically clipped to the vehicle 100 to hold the rear window 104 in place. In some instance, when that bar is not properly clipped into place, the bar can slide out of the soft top 102 while the vehicle 100 is moving, such as during turns. A further aspect of the present disclosure includes the second support arm 206 being coupled in such a way to the soft top 102 that the second support arm 206 can retain the bar in the soft top 102 when it isn't properly clipped into place.

As depicted in FIG. 4, when the first support arm 204 and the second support arm 206 are pivoted to the closed position depicted, an angle 'A' between their respective top surfaces is substantially greater than 180°.

Although the depicted embodiments show specific configurations for the support arms, it is noted that the particular configuration of the support arms may vary as desired. For example, the support arms may be formed as rectangular bars, cylindrical rods, pipe, etc. Other configuration may also be possible without going beyond the scope of the present disclosure.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A support for a rear window of a vehicle soft top structure, comprising:
   a first support arm pivotably coupled to a portion of a vehicle;
   a second support arm pivotably coupled to the first support arm and pivotably coupled to a rear window of a soft top structure;
   wherein the first support arm and the second support arm pivot relative to each other to form an angle less than 180° in an open position, and an angle substantially greater than 180° in a closed position.

2. The support of claim 1, wherein the first support arm is pivotably coupled to a roll bar of the vehicle.

3. The support of claim 2, wherein the first support arm is pivotably coupled to a ring positioned around the roll bar.

4. The support of claim 1, wherein the second support arm comprises:
   a protrusion located adjacent the first support arm, the protrusion inhibiting rotation of the first support arm relative to the second support arm beyond the protrusion in the open position.

5. A vehicle, comprising:
   a soft top structure coupled to the vehicle, the soft top structure include a rear window panel;
   a first support arm pivotably coupled to a portion of the vehicle;
   a second support arm pivotably coupled to the first support arm and pivotably coupled to the rear window panel;
   wherein the first support arm and the second support arm pivot relative to each other to form an angle less than 180° in an open position, and an angle substantially greater than 180° in a closed position.

6. The vehicle of claim 5, further comprising a connector positioned in a box-shaped component of the rear window panel, wherein wherein the second support arm is pivotably coupled to the connector.

7. The vehicle of claim 5, wherein the first support arm is pivotably coupled to a roll bar of the vehicle.

8. The vehicle of claim 5, wherein the second support arm comprises:
   a protrusion located adjacent the first support arm, the protrusion inhibiting rotation of the first support arm relative to the second support arm beyond the protrusion in the open position.

* * * * *